(12) United States Patent
Chartouni et al.

(10) Patent No.: US 7,881,033 B2
(45) Date of Patent: *Feb. 1, 2011

(54) HIGH-VOLTAGE SYSTEM AND HIGH-POWER CIRCUIT BREAKER WITH COOLING

(75) Inventors: Daniel Chartouni, Baden (CH); Martin Lakner, Gebenstorf (CH); Jean-Claude Mauroux, Hunzenschwil (CH); Thomas Shoenemann, Schafisheim (CH); Jochen Kiefer, Nussbaumen (CH); Lukas Zehnder, Baden-Daettwil (CH); Marc Mollenkopf, Schoenenwerd (CH)

(73) Assignee: ABB Research Ltd, Zurich (CH)

( * ) Notice: Subject to any disclaimer, the term of this patent is extended or adjusted under 35 U.S.C. 154(b) by 318 days.

This patent is subject to a terminal disclaimer.

(21) Appl. No.: 11/281,363

(22) Filed: Nov. 18, 2005

(65) Prior Publication Data

US 2006/0120024 A1 Jun. 8, 2006

(30) Foreign Application Priority Data

Dec. 3, 2004 (EP) ................................. 04405751

(51) Int. Cl.
*H01H 73/06* (2006.01)
(52) U.S. Cl. ..................................................... 361/115
(58) Field of Classification Search ................... 361/115
See application file for complete search history.

(56) References Cited

U.S. PATENT DOCUMENTS

| | | | | | |
|---|---|---|---|---|---|
| 3,609,206 | A | * | 9/1971 | McConnell | 174/15.6 |
| 3,769,551 | A | * | 10/1973 | Corman et al. | 361/676 |
| 3,946,142 | A | * | 3/1976 | Kellow et al. | 174/15.6 |
| 4,378,461 | A | | 3/1983 | Haginomori | |
| 6,236,562 | B1 | * | 5/2001 | Wilfert et al. | 361/676 |
| 7,253,379 | B2 | * | 8/2007 | Lakner et al. | 219/494 |

FOREIGN PATENT DOCUMENTS

| | | |
|---|---|---|
| DE | 2 051 150 | 4/1972 |
| EP | 1 022 830 A1 | 7/2000 |

OTHER PUBLICATIONS

English translation of DE 2051150.*
English translation of DE 20251150; Blum et. al; Apr. 20, 1972.*

(Continued)

*Primary Examiner*—Jared J Fureman
*Assistant Examiner*—Nicholas Ieva
(74) *Attorney, Agent, or Firm*—Buchanan Ingersoll & Rooney PC

(57) ABSTRACT

The high-voltage system has at least one feed line and at least one high-power circuit breaker, the at least one feed line having a longitudinally extended feed line inner conductor and a feed line outer conductor surrounding the feed line inner conductor, and the high-power circuit breaker having a longitudinally extended circuit breaker inner conductor and a circuit breaker outer conductor surrounding the circuit breaker inner conductor in the form of a housing, and the inner conductors and the outer conductors being electrically conductively connected to one another. At least one heat pipe is provided for the purpose of dissipating thermal energy from the circuit breaker inner conductor. The heat pipe interacts with a cooling gas flow extending along the circuit breaker inner conductor.

9 Claims, 2 Drawing Sheets

OTHER PUBLICATIONS

K. Albert, et al., "Elektrischer Eigenbedarf/Energietechnik in Kraftweken Und Industrie (Electrical Power Station Services Consumption/Power Engineering in Power Stations and Industry)", VDE Verlag, pp. 431-445 (cited in the specification); Jan. 1, 1996.

European Search Report dated Jun. 13, 2005 (with English translation of category of cited documents).

* cited by examiner

HIGH-VOLTAGE SYSTEM AND HIGH-POWER CIRCUIT BREAKER WITH COOLING

RELATED APPLICATIONS

This application is based on and claims priority to European Application No. 04405751.1, filed Dec. 3, 2004, the entire content of which is hereby incorporated by reference.

TECHNICAL FIELD

The invention relates to the field of high-power circuit breaker technology. It relates to a high-voltage system and a high-power circuit breaker and a method for cooling an inner conductor of a high-power circuit breaker in accordance with the precharacterizing clause of the independent patent claims.

PRIOR ART

K. Albert et al., Elektrischer Eigenbedarf/Energie-technik in Kraftwerken und Industrie [Electrical power station services consumption/power engineering in power stations and industry], VDE Publishing House, ISBN 3-8007-1586-4, Chapter 10.3 (pages 431-455) has disclosed generator output lines with forced cooling (which can also be referred to as longitudinally blown or air-cooled generator output lines). Two tubular conductors extending essentially coaxially form an inner conductor and an outer conductor surrounding said inner conductor in the form of a housing, said conductors producing an electrical connection between a generator and a block or machine transformer. The outer conductor carries a reverse current, which flows in the opposite direction to the current flowing in the inner conductor. In order to cool the inner conductor, which is permanently subjected to typically 20 kA to 25 kA, an air flow, which extends along the inner conductor, is produced by means of blowers. A generator circuit breaker is provided in the generator output line.

EP 1 022 830 A1 has also disclosed providing blowers for the purpose of cooling a housed inner conductor of a high-power circuit breaker, by means of which blowers a circulating flow is produced which flows around the inner conductor essentially perpendicular to its extent. The gas circulated in this manner absorbs heat loss from the inner conductor and then emits this to the inside of the housing. In turn, the housing emits heat to the ambient air outside the housing. Owing to the cooling of the inner conductor, an increased current-carrying capability is achieved.

It is desirable to provide a high-power circuit breaker and a high-voltage system containing a high-power circuit breaker with greater current-carrying capability and a corresponding method for cooling an inner conductor of a high-power circuit breaker.

SUMMARY OF THE INVENTION

One object of the invention is therefore to provide a high-voltage system, a high-power circuit breaker and a method for cooling an inner conductor of a high-power circuit breaker of the type mentioned initially, which have an increased current-carrying capability.

This object is achieved by apparatuses and a method having the features of the independent patent claims.

A high-power circuit breaker, whose inner conductor (which can also be referred to as the active part) is cooled, can carry higher currents than an uncooled high-power circuit breaker whilst adhering to temperature limit values prescribed by relevant standards. The current-carrying capability of a high-power circuit breaker can thus be increased to a greater extent the more efficiently a cooling apparatus provided can dissipate the heat loss produced at the inner conductor.

A high-voltage system according to the invention has at least one feed line and at least one high-power circuit breaker, the at least one feed line having a longitudinally extended feed line inner conductor and a feed line outer conductor surrounding the feed line inner conductor (advantageously in the form of a housing), and the high-power circuit breaker having a longitudinally extended circuit breaker inner conductor and a circuit breaker outer conductor surrounding the circuit breaker inner conductor in the form of a housing. The inner conductors and the outer conductors are electrically conductively connected to one another.

The high-voltage system is characterized by the fact that at least one heat pipe is provided for the purpose of dissipating thermal energy from at least one of the inner conductors, in particular the circuit breaker inner conductor.

A heat pipe is a means for dissipating the heat by evaporation of a working medium in a section (referred to as the evaporator) of the heat pipe and condensing the working medium in a section (referred to as the condenser) of the heat pipe, means for passing the working medium back from the condenser to the evaporator being provided. The heat pipe is advantageously hermetically sealed such that a closed circuit can be produced therein. An elongate or tubular shape of the heat pipe is advantageous but not necessary. As means for passing the working medium back from the condenser to the evaporator, a hollow body can simply be taken and arranged such that, owing to gravity, the liquid working medium is passed back, or else a material may be used which causes the working medium to be transported back owing to capillary forces.

Such a heat pipe can be arranged in the space between the circuit breaker inner conductor and the circuit breaker outer conductor, in which case it is possible to dispense with an insulating path arranged between the evaporator and the condenser. The heat pipe can advantageously be essentially at the potential of the inner conductor.

A heat pipe is a passive cooling apparatus. It does not require a current supply or any other supply. As a cooling system with a hermetically sealed circuit, it generally does not require any maintenance and can generally function over years and decades without any maintenance.

The feed line inner conductor and the circuit breaker inner conductor are generally tubular or hollow-cylindrical. The respective outer conductor carrying the reverse current forms an encapsulation, which is generally grounded. During operation, a high voltage is applied between the inner conductor and the outer conductor.

For a high-power circuit breaker and the feed lines, the rated voltages are greater than 1 kV or rather of the order of magnitude of 10 kV, or they are several 10 kV to several 100 kV. Overvoltages (owing to lightning impulses) are typically from 100 kV to several 100 kV. The currents and reverse currents are of the order of magnitude of 1 kA or 10 kA (rated current), often from 20 kA to 30 kA; the short-circuit currents are approximately an order of magnitude greater. A high-power circuit breaker and corresponding feed lines are designed for powers of the order of magnitude of 100 kW or several 100 MW or up to in the gigawatt range. Such currents, voltages and powers bring about a physical implementation and a symmetry of the design of the high-power circuit breaker and of feed lines which are not necessary, for example, for medium-voltage or low-voltage circuit breakers.

Owing to this design, magnetic fields occurring outside the high-voltage system and induced by the high currents can be kept very low.

The heat to be dissipated is essentially produced by resistive losses in the inner conductor. Yet other losses may also be added, for example, such as those owing to the skin effect, or eddy current losses and hysteresis losses.

At least one cooling gas flow production means is advantageously provided, by means of which a cooling gas flow, in particular an air flow, which extends essentially along the extent of the circuit breaker inner conductor, can be produced within the circuit breaker outer conductor. At least one cooling gas flow production means is particularly advantageously provided, by means of which a cooling gas flow, in particular an air flow, extending essentially along the extent of the circuit breaker inner conductor can be produced in the space between the circuit breaker inner conductor and the circuit breaker outer conductor. Owing to forced cooling, a markedly increased current-carrying capability can be achieved.

The condenser particularly advantageously interacts with the cooling gas flow. As a result, very efficient cooling of the circuit breaker inner conductor can be achieved since the condenser can be kept at a low temperature by the cooling gas cooling of the condenser, as a result of which efficient condensing of the working gas and thus a high degree of efficiency of the heat pipe can be achieved.

In a likewise particularly advantageous manner, the evaporator is in close thermal contact with the circuit breaker inner conductor. As a result, a particularly large amount of heat loss from the inner conductor can be dissipated.

The condenser advantageously has an apparatus for emitting heat. This apparatus may contain, for example, a cooling fin arrangement. In particular, some or all of the cooling fins of the cooling fin arrangement can extend essentially along the extent of the circuit breaker inner conductor. The apparatus for emitting heat very advantageously interacts with the cooling gas flow.

The cooling gas flow advantageously extends within the circuit breaker outer conductor and within the feed line outer conductor. The cooling gas flow particularly advantageously extends in the space between the circuit breaker inner conductor and the circuit breaker outer conductor and in the space between the feed line inner conductor and the feed line outer conductor. The cooling gas flow advantageously extends essentially along the extent of the respective inner conductor.

The inner conductor and the feed line outer conductor are preferably essentially hollow-cylindrical. The circuit breaker outer conductor may also be essentially hollow-cylindrical. The circuit breaker inner conductor advantageously extends essentially coaxially with respect to the circuit breaker outer conductor and/or the feed line inner conductor advantageously extends essentially coaxially with respect to the feed line outer conductor.

The high-voltage system preferably has a plurality of, in particular three, poles, each having at least one feed line, in particular two feed lines, and at least one high-power circuit breaker pole. Each high-power circuit breaker pole has at least one heat pipe. The circuit breaker poles can be referred to, by way of summary, as high-power circuit breakers.

The high-voltage system may advantageously be a generator output line, in particular a generator output line with forced cooling.

A high-power circuit breaker according to the invention having a longitudinally extended circuit breaker inner conductor and a circuit breaker outer conductor surrounding the circuit breaker inner conductor in the form of a housing is characterized by the fact that at least one heat pipe is provided for the purpose of dissipating thermal energy from the circuit breaker inner conductor, which heat pipe contains a working medium for the purpose of dissipating the thermal energy by evaporation of the working medium in a section (referred to as the evaporator) of the heat pipe and condensing the working medium in a section (referred to as the condenser) of the heat pipe, and the condenser being provided for the purpose of interacting with a cooling gas flow extending within the circuit breaker outer conductor. The condenser is particularly advantageously envisaged for interacting with a cooling gas flow extending in the space between the circuit breaker inner conductor and the circuit breaker outer conductor.

Improved cooling of the inner conductor and an increased current-carrying capability are achieved.

The method according to the invention for cooling a longitudinally extended circuit breaker inner conductor, which is surrounded by a circuit breaker outer conductor in the form of a housing, of a high-power circuit breaker is characterized by the fact that a working medium is evaporated by thermal energy from the circuit breaker inner conductor being absorbed and is condensed in a section (referred to as the condenser) of the heat pipe with emission of heat, the condenser being cooled within the circuit breaker outer conductor by a cooling gas flow extending essentially along the extent of the circuit breaker inner conductor. The condenser is advantageously cooled in the space between the circuit breaker inner conductor and the circuit breaker outer conductor by a cooling gas flow extending essentially along the extent of the circuit breaker inner conductor.

In one advantageous embodiment, the heat pipe is in the form of a thermosiphon. When the heat pipe is in the form of a thermosiphon, the condensed working medium is (predominantly) transported back owing to gravity. The condenser is thus arranged higher (in the gravitational field) than the evaporator, and a monotonous drop needs to be present along the heat pipe between said condenser and said evaporator.

In one further advantageous embodiment, the heat pipe contains a means for the purpose of passing condensed working medium back to the evaporator owing to capillary forces. Such an embodiment is preferably used when the condenser is arranged below the evaporator; however, it may also be used in connection with a thermosiphon. Porous materials, for example, may be used as the means for passing condensed working medium back to the evaporator owing to capillary forces. Meshed and/or knitted materials are likewise suitable. Such means are preferably provided on the inner surface of the heat pipe. Depending on whether an insulating path between the evaporator and the condenser is intended to be formed or not, only electrically insulating materials or else electrically conductive materials are suitable.

In another advantageous embodiment, the evaporator is integrated in the inner conductor. For example, the inner conductor can be designed such that it contains one or more volumes, which represent part of the heat pipe and are filled completely or partially with working medium. As a result, very good thermal coupling between the heat pipe and the inner conductor is provided.

The inner conductor may advantageously have a plurality of sections, which are each provided with at least one heat pipe. In particular in the case of very long circuit breakers or feed lines having long inner conductors, very efficient cooling is possible as a result of the fact that a plurality of sections, which are arranged one behind the other in the longitudinal direction, of the high-power circuit breaker or the feed line are each associated with at least one heat pipe along the longitudinal extent of the inner conductor.

In one preferred embodiment, the high-power circuit breaker is a generator circuit breaker.

The invention may also be seen to be the fact that a high-voltage system having at least one feed line and/or at least one high-power circuit breaker is provided which has at least one heat pipe in a feed line and/or in a high-power circuit breaker, said heat pipe serving the purpose of cooling an inner conductor of the feed line and/or the inner conductor of the high-power circuit breaker. In particular, the evaporator of the heat pipe and the condenser of the heat pipe can be at the same potential and/or be free of an insulating path provided between the evaporator and the condenser. A corresponding method for cooling an inner conductor of a feed line or an inner conductor of a high-power circuit breaker is characterized by the fact that the inner conductor is cooled by means of a heat pipe.

Further preferred embodiments and advantages are described in the dependent patent claims and the figures.

BRIEF DESCRIPTION OF THE DRAWINGS

The subject matter of the invention will be explained in more detail below with reference to preferred exemplary embodiments, which are illustrated in the attached drawings, in which.

Figure 1:
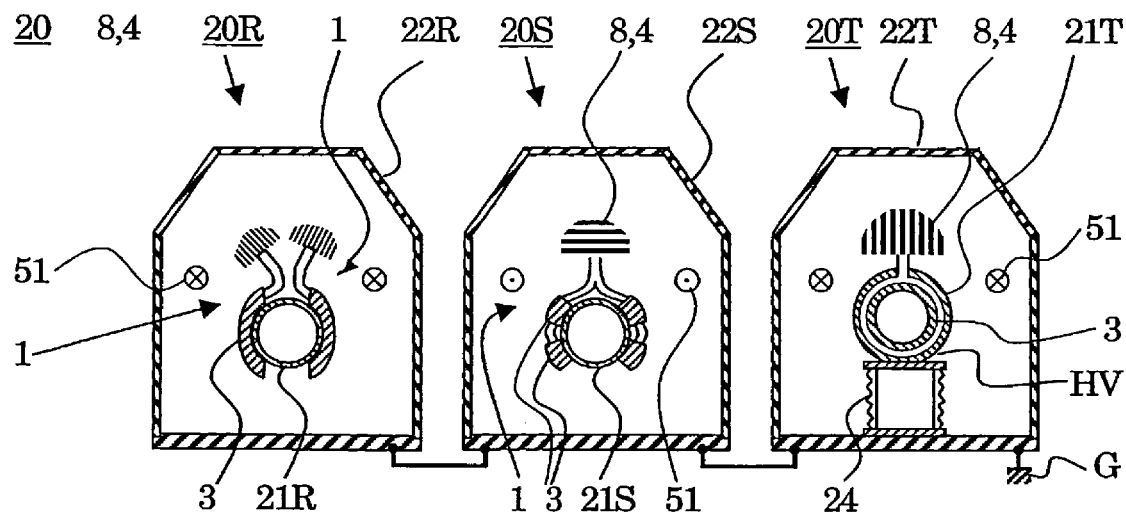
FIG. 1 shows a schematic of a section through a three-pole generator circuit breaker, three different types of arrangement of the heat pipe being illustrated.

The references used in the drawings and their meanings are listed by way of summary in the list of references. In principle, the same parts or parts having the same function are provided with the same references in the figures. For understanding of the invention, non-essential parts are sometimes not illustrated. The exemplary embodiments described represent the subject matter of the invention by way of example and have no restrictive effect.

APPROACHES TO IMPLEMENTING THE INVENTION

FIG. 1 shows a schematic of a section through a three-pole generator circuit breaker. Each of the circuit breaker poles 20R, 20S, 20T has a tubular circuit breaker inner conductor 21R, 21S, 21T, which is surrounded in each case by a housing-like circuit breaker outer conductor 22R, 22S, 22T. During operation, a high voltage HV is applied between the circuit breaker inner conductor and the respective circuit breaker outer conductor, the outer conductor being at ground potential G and carrying the reverse current. In general, the three poles are grounded at a common star point, which is different to the design shown in FIG. 1. Since the circuit breaker inner conductor is housed and generally has a smaller cross section than the outer conductor, a heat loss to be dissipated is produced at the circuit breaker inner conductor, while the outer conductor, which is subjected to the ambient air, is heated to a relatively little extent. At points which could be touched, a high-power circuit breaker generally should be no warmer than 70° C. or 80° C.

Feed lines for the purpose of producing an electrical connection to the high-power circuit breaker 20 are not shown in FIG. 1. Such a feed line has a feed line inner conductor and a feed line outer conductor surrounding this feed line inner conductor. In the text below, the words inner conductor and outer conductor will also be used without the prefix "circuit breaker" or "feed line", in which case the context dictates whether a feed line inner conductor/outer conductor or a circuit breaker inner conductor/outer conductor is meant or whether both types could be meant.

In order to dissipate the heat loss from the inner conductor, each of the inner conductors 21R, 21S, 21T is cooled by means of (at least) one heat pipe 1. Typically, each pole of a high-power circuit breaker is cooled by means of a similarly arranged and designed heat pipe 1; however, in FIG. 1 another heat pipe arrangement is illustrated in each pole. Each heat pipe 1 contains a working medium, which is evaporated in a section (referred to as the evaporator 3) of the heat pipe 1 and is condensed in a section (referred to as the condenser 4) of the heat pipe 1.

R Pole (Left-Hand Side in FIG. 1):

The evaporator 3 has two metallic elements (for example made from aluminum), which are essentially in the form of hollow cylinder segments, whose shape is matched to the design of the inner conductor 21R and which are fixed to the inner conductor 21R such that they are in good thermal contact with said inner conductor 21R. The elements are one possible embodiment of means for thermally coupling the evaporator and the inner conductor. In this case, the elements are in the form of hollow bodies and are filled with predominantly liquid working medium. The hollow bodies are in each case part of a heat pipe 1.

A preferably metallic pipe piece connects each of the evaporators 3 with in each case one condenser 4. Such a condenser 4 has a preferably metallic cooling fin arrangement 8, which is arranged in the space between the inner conductor 21 and the outer conductor 22 and advantageously has a pipe system (not illustrated), in which the gaseous working medium can propagate in order then to condense therein and flow back to the evaporator 3 again. Parts of such a pipe system are advantageously arranged in at least some of the cooling fins.

A heat exchanger, for example, may also be used as the means for emitting heat 8.

The cooling fin arrangement 8 is in thermal contact with a cooling gas, which is moved along the extent of the inner conductor 21 in order to achieve forced cooling. Air is typically used as the cooling gas. A cooling gas flow 51 is produced by means of a blower (not shown). The circuits provided with a cross or a dot (in the center in FIG. 1) indicate the direction of the cooling gas flow 51: into the plane of the drawing or out of the plane of the drawing. It is also conceivable for at least one evaporator 3 to be arranged within the inner conductor 21, and in this case advantageously (also) for a cooling gas flow to be provided within the inner conductor 21.

The means for emitting heat 8 are oriented and designed such that they are subjected to a high level of flow 51, with the result that optimized cooling performance can be achieved. The size and arrangement of the condenser 4 and the means for emitting heat 8 is, however, severely limited by the fact that no such excessive fields should be produced in the dielectrically loaded space between the inner conductor 21 and the outer conductor 22, which excessive fields could lead to undesired flashovers. Since the cooling fin arrangements 8 are generally at the same potential as the inner conductor 21, they are advantageously arranged close to the inner conductor 21 and are also advantageously rounded off, as is also illustrated in FIG. 1.

S Pole (in the Center in FIG. 1):

The evaporator 3 has two times two metallic elements, which are essentially in the form of hollow cylinder segments, whose shape is matched to the design of the inner conductor 21S and which are fixed to the inner conductor 21S such that they are in good thermal contact with said inner conductor 21S. These elements are filled with predominantly liquid working medium and are connected to one another by means of preferably metallic pipes belonging to a heat pipe 1. Planar, flat sections may be provided on the outer conductor 22S, on which sections the elements are brought into contact with the inner conductor 21S, for example by means of screws.

Instead of the 1 and 4 elements illustrated on the left-hand side and in the center in FIG. 1, a heat pipe 1 may also have 2, 3, 5, 6, 7, 8 or more elements, which absorb heat from the inner conductor 21.

Figure 4:
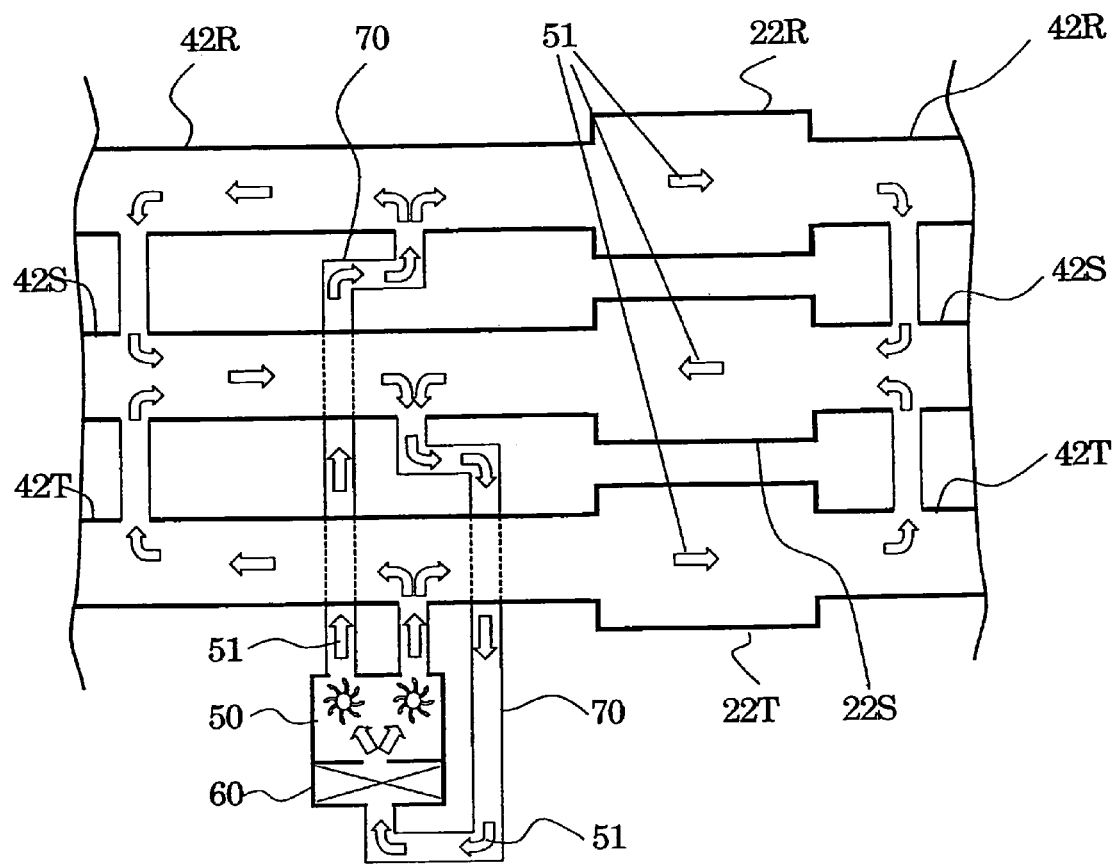
FIG. 4 shows a schematic of a ventilation scheme for a three-pole high-voltage system, inner conductors not being illustrated.

The flow direction in the central pole (S pole) is advantageously in the opposite direction to the direction of the flow 51 in the other poles (cf. reference 51). A corresponding ventilation scheme is illustrated in FIG. 4.

T Pole (on the Right-Hand Side in FIG. 1):

In the case of the T pole, the evaporator 3 is integrated in the inner conductor 21T in the form of preferably tubular volumes, which are provided within the inner conductor cross section. As a result, very effective thermal coupling between the inner conductor 21T and the evaporator 3 is provided. (The inner conductor 21T in the case of the T pole is illustrated as being larger and thicker than in the case of the other poles in FIG. 1.)

While the condenser 4 is always arranged above the evaporator 3 in FIG. 1 such that the corresponding heat pipe 1 is in the form of a thermosiphon, it is also conceivable for the condenser 4 to be arranged below the evaporator 3. At least in this case, a means for passing condensed working medium back to the evaporator is provided. This can preferably take place by means of capillary forces. In the case of the T pole, a post insulator 24 is illustrated, which supports the inner conductor 21T.

Figure 2:
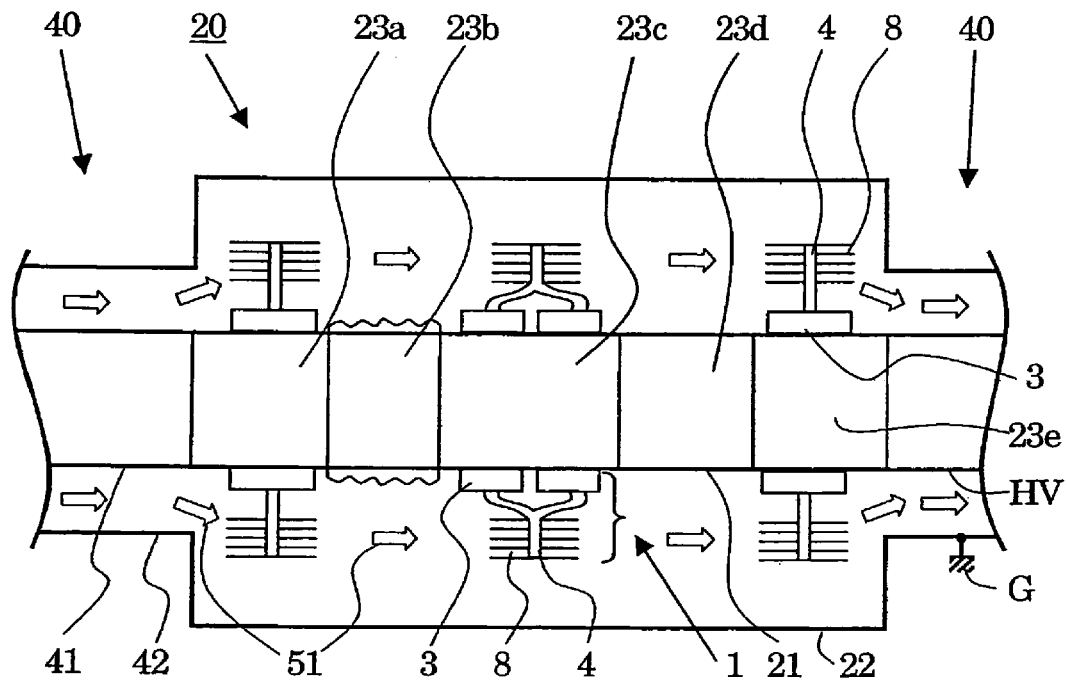
FIG. 2 shows a schematic of a predominantly sectioned, plan view of a high-voltage system having a high-power circuit breaker or circuit breaker pole and two feed lines, the inner conductor of the high-power circuit breaker having a plurality of sections and being provided with a plurality of heat pipes.

FIG. 2 shows a schematic of a partially sectioned plan view of a high-voltage system, which has a circuit breaker or circuit breaker pole 20, which has a similar design to the R pole in FIG. 1. The circuit breaker inner conductor 21 has a plurality of sections 23a to 23e, of which a plurality (three) are provided with two heat pipes 1 which are arranged essentially symmetrically.

The section 23a is a connection housing 23a, which serves the purpose of connecting the circuit breaker 20 to the generator output line. The connection housing 23a is cooled by means of two heat pipes 1, which have cooling fins 8. The section 23b is a quenching chamber, which serves the purpose of contact isolation and quenching the arc. Connected thereto is the drive housing 23c, in which a drive is arranged for the purpose of making contact isolation possible in the quenching chamber 23b. The drive housing 23c is cooled by two heat pipes 1, which each have two elements (hollow bodies), which are fixed to the drive housing 23c and are in good thermal contact with said drive housing 23c.

Provided next to the drive housing 23c is a moving isolator pipe 23d, which serves the purpose of producing a visible isolating path. Provided next to this is an isolator housing 23e, which serves the purpose of accommodating the isolator pipe. The isolator housing 23e is in this case cooled in the same manner as the connection housing 23a.

The air flow 51 and its direction are symbolized by open arrows.

The high-power circuit breaker or circuit breaker pole 20 is connected to two feed lines 40, which each have a tubular inner conductor 41 and a tubular outer conductor 42, which coaxially surrounds the inner conductor 41.

One feed line 40 advantageously produces a connection to a generator, while the other feed line 40 produces a connection to a block transformer or machine transformer.

Figure 3:
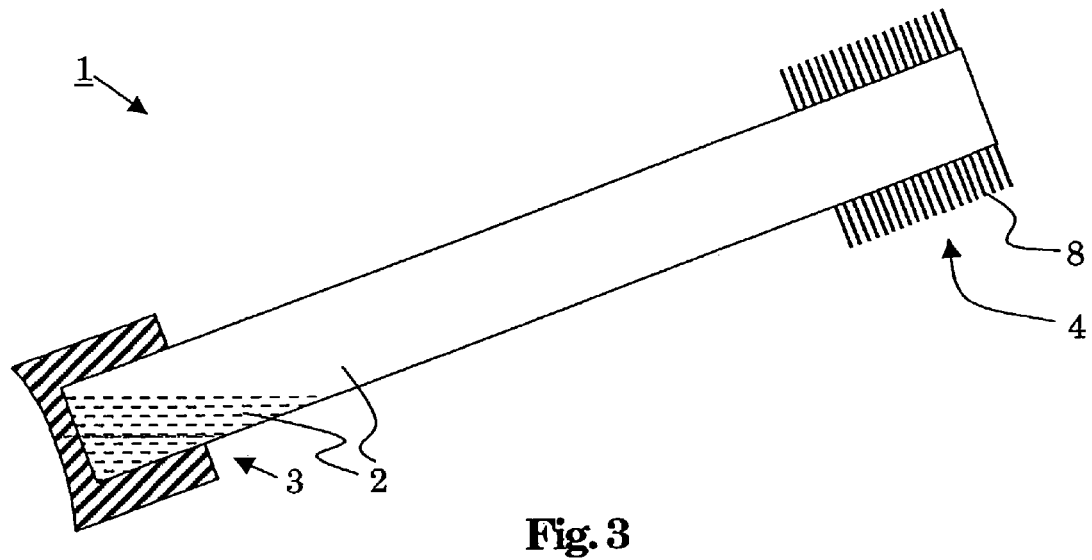
FIG. 3 shows a schematic of a heat pipe having a cooling fin arrangement and a means for thermally coupling the evaporator and the inner conductor.

FIG. 3 shows a schematic of a heat pipe 1. Said heat pipe 1 is hermetically sealed such that a closed circuit is present within the heat pipe and (practically) no maintenance is necessary. The evaporator 3 has an element, which serves the purpose of thermally coupling the evaporator 3 to a body to be cooled (for example a circuit breaker inner conductor). The working medium is provided with the reference 2. It is in the fluid state (hatched with dashed lines) and in the gaseous state (not hatched). The condenser 4 of the heat pipe 1 shown in FIG. 3 is provided with cooling fins 8.

The working temperature range for which a heat pipe 1 is to be designed may be prescribed by the fact that this temperature range, in the envisaged application, is prescribed by a minimum ($T_{min}$) and a maximum ($T_{max}$) working temperature. For example, in an application in a typical high-power circuit breaker, for example a generator circuit breaker, a range is possible in which $T_{min}$=−40° C. and $T_{max}$=+60° C. or $T_{min}$=−25° C. and $T_{max}$=+60° C.

Suitable working media 2 are, for example, water, acetone, fluorinated hydrocarbons, such as "FC-72" by 3M, or hydrofluoroether, such as "HFE-7100" by 3M. The thermal power dissipated by means of a heat pipe 1 is typically between 0.5 kW and 1.5 kW.

It is possible to provide an electrical insulating path between the evaporator 3 and the condenser 4 such that evaporation and condensing can take place at different electrical potentials. For example, the condenser may then be electrically connected to the outer conductor, while the evaporator is electrically connected to the inner conductor. Such an insulating path may, however, also be dispensed with.

As an alternative or in addition to the provision of at least one heat pipe on the circuit breaker inner conductor, at least one heat pipe may also be provided on a feed line inner conductor, in order to increase the current-carrying capability of the feed line.

A heat pipe may also have a plurality of hollow parts which are connected to one another, for example two hollow parts which are connected to one another in the form of blades. For example, the evaporated working medium can flow to the condenser in one hollow part, while the condensed working medium flows back to the evaporator in another hollow part.

FIG. 4 shows a schematic of a ventilation scheme for a three-pole high-voltage system having in each case two feed lines and one circuit breaker pole per pole (R, S, T). It is an enclosed ventilation system using air as the cooling gas. Only the outer conductors 22, 42 are illustrated since the illustration of the inner conductors has been dispensed with in favor of clarity of the illustration.

A blower 50, which advantageously has one or more fans, moves air through advantageously electrically insulating ventilation lines 70 into the two outer circuit breaker poles (R and T). There, the air flow 51 moves essentially along the extent of the inner conductors, in order then to reach the central circuit breaker pole (S pole) via further ventilation lines 70. There, the air flow 51 likewise moves essentially along the extent of the inner conductors, but in the opposite direction to that in the two other poles. The cooling gas then emerges from the circuit breaker pole via a further ventilation line 70 and is cooled by means of a cooling unit 60. Once the gas has again emitted the thermal energy absorbed at the inner conductors in the cooling unit, it is accelerated again by means of the blower 50 and passed to the two outer poles R, T, and the circuit begins again.

Further possibilities for producing a cooling gas flow 51 are conceivable. For example, through-ventilation may also be provided, which sucks in ambient air and blows it into the outer conductors, and the air then emerging again from the outer conductor once the heat loss from the inner conductor(s) has been absorbed. In this case, the direction of the cooling gas flow advantageously extends in all poles along the same direction.

The amount of air moved per unit time through a circuit breaker pole is typically between 2 m³/s and 10 m³/s, advantageously between 4 m³/s and 8 m³/s.

The pipe diameter of typical inner conductors is between 30 cm and 60 cm, in particular between 40 cm and 50 cm. Typical outer conductor diameters are 80 cm to 1.3 m.

LIST OF REFERENCES

1 Heat pipe
2 Working medium
3 Evaporator
4 Condenser
8 Apparatus for emitting heat, heat exchanger, cooling fin arrangement, radiator
20 High-power circuit breaker, circuit breaker pole, generator circuit breaker
20R, 20S, 20T Circuit breaker pole
21 Circuit breaker inner conductor, tubular conductor
21R, 21S, 21T Circuit breaker inner conductor
22 Circuit breaker outer conductor, circuit breaker encapsulation, circuit breaker housing
22R, 22S, 22T Circuit breaker outer conductor
23 Section of the inner conductor
23a Connection housing
23b Quenching chamber
23c Drive housing
23d Moving isolator pipe
23e Isolator housing
24 Post insulator
40 Feed line
41 Feed line inner conductor, pipe conductor
42 Feed line outer conductor, pipe conductor
42R, 42S, 42T Feed line outer conductor
50 Cooling gas flow production means, air flow production means, blower, fan
51 Cooling gas flow, air flow
60 Cooling unit
70 Cooling gas line, ventilation line
G Ground potential
HV High voltage, high-voltage potential
R, S, T Pole

The invention claimed is:

1. A high-voltage system comprising:
at least one feed line and at least one high-power circuit breaker, the at least one feed line having a longitudinally extended feed line inner conductor and a feed line outer conductor surrounding the feed line inner conductor, and the high-power circuit breaker having a longitudinally extended circuit breaker inner conductor and a circuit breaker outer conductor surrounding the circuit breaker inner conductor in the form of a housing, and the feed line inner conductor and the circuit breaker inner conductor being electrically conductively connected to one another and the feed line outer conductor and the circuit breaker outer conductor being electrically conductively connected to one another,
wherein at least one heat pipe is provided in a space between the circuit breaker inner conductor and the circuit breaker outer conductor for the purpose of dissipating thermal energy from at least one of the feed line inner and the circuit breaker inner conductor, and
wherein an entire length of the at least one heat pipe is provided in the space between the circuit breaker inner conductor and the circuit breaker outer conductor,
wherein at least one production means for flow of cooling gas is provided, by means of which a cooling gas flow, which extends along the longitudinal axis of the circuit breaker inner conductor, can be produced within the circuit breaker outer conductor, and
wherein the heat pipe contains a working medium that dissipates the thermal energy by evaporating the working medium in an evaporator section of the heat pipe and condensing the working medium in a condenser section of the heat pipe, and the evaporator section being in close thermal contact with the circuit breaker inner conductor, and the condenser section interacting with the cooling gas flow.

2. The high-voltage system as claimed in claim 1, wherein an apparatus for emitting heat is a cooling fin arrangement, which has cooling fins which extend essentially along the extent of the circuit breaker inner conductor.

3. The high-voltage system as claimed in claim 1, wherein the cooling gas flow extends essentially along the extent of the respective inner conductor within the circuit breaker outer conductor and within the feed line outer conductor.

4. The high-voltage system as claimed in claim 1, wherein the circuit breaker inner conductor, the feed line inner conductor and the feed line outer conductor are essentially hollow-cylindrical.

5. The high-voltage system as claimed in claim 1, wherein the circuit breaker inner conductor extends essentially coaxially with respect to the circuit breaker outer conductor and/or the feed line inner conductor extends essentially coaxially with respect to the feed line outer conductor.

6. The high-voltage system as claimed in claim 1, wherein it contains a plurality of poles, each having two feed lines and a high-power circuit breaker having at least one heat pipe.

7. The high-voltage system as claimed in claim 1, wherein it is a longitudinally blown generator output line.

8. A high-power circuit breaker comprising:
a longitudinally extended circuit breaker inner conductor and a circuit breaker outer conductor surrounding the circuit breaker inner conductor in the form of a housing,
wherein at least one heat pipe is provided in a space between the inner conductor and the outer conductor for the purpose of dissipating thermal energy from the circuit breaker inner conductor, which heat pipe contains a working medium for the purpose of dissipating the thermal energy by evaporation of the working medium in a section referred to as the evaporator of the heat pipe and condensing the working medium in a section referred to as the condenser of the heat pipe, and the condenser being provided for the purpose of interacting with a cooling gas flow extending within the circuit breaker outer conductor, and
wherein an entire length of the at least one heat pipe is provided in the space between the inner conductor and the outer conductor and wherein at least one production means for flow of cooling gas is provided, by means of which a cooling gas flow, which extends along the longitudinal axis of the circuit breaker inner conductor, can be produced within the circuit breaker outer conductor.

9. A method for cooling a longitudinally extended circuit breaker inner conductor, which is surrounded by a circuit breaker outer conductor in the form of a housing, of a high-power circuit breaker, the method comprising:
- evaporating a working medium by thermal energy from the circuit breaker inner conductor being absorbed;
- condensing the working medium in a section referred to as the condenser of the heat pipe with emission of heat, the condensor being arranged in a space between the inner conductor and the outer conductor; and
- cooling the condenser within the circuit breaker outer conductor by a cooling gas flow extending essentially along the extent of the circuit breaker inner conductor, and
- wherein an entire length of the condenser is provided in the space between the inner conductor and the outer conductor,
- providing at least one production means for flow of cooling gas, and
- producing a cooling gas flow which extends along the longitudinal axis of the circuit breaker inner conductor within the circuit breaker outer conductor.

* * * * *